United States Patent
Yi et al.

(10) Patent No.: US 11,038,877 B2
(45) Date of Patent: *Jun. 15, 2021

(54) SYSTEMS AND METHODS FOR DEVICE FINGERPRINT DETERMINATION IN A TRANSPORTATION SERVICE

(71) Applicant: Beijing DiDi Infinity Technology and Development Co., Ltd., Beijing (CN)

(72) Inventors: Xiaoyong Yi, Mountain View, CA (US); Yu Wang, Mountain View, CA (US); Fengmin Gong, Mountain View, CA (US)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 106 days.

This patent is subject to a terminal disclaimer.

(21) Appl. No.: 16/237,043

(22) Filed: Dec. 31, 2018

(65) Prior Publication Data
US 2020/0213299 A1 Jul. 2, 2020

(51) Int. Cl.
*H04L 29/06* (2006.01)
*H04W 12/06* (2021.01)

(52) U.S. Cl.
CPC ......... *H04L 63/0861* (2013.01); *H04W 12/06* (2013.01)

(58) Field of Classification Search
None
See application file for complete search history.

(56) References Cited

U.S. PATENT DOCUMENTS 8,471,763 B2    6/2013    Daems et al.
9,805,370 B1*   10/2017   Quigley ............. G06Q 20/3278
(Continued)

FOREIGN PATENT DOCUMENTS

CN     104869638 A    8/2015
CN     105657659 A    6/2016
(Continued)

OTHER PUBLICATIONS

International Search Report issued in corresponding International Application No. PCT/US2018/068218, dated Apr. 1, 2019, 5 pages.
(Continued)

*Primary Examiner* — Brandon S Hoffman
(74) *Attorney, Agent, or Firm* — Bayes PLLC

(57) ABSTRACT

Embodiments of the disclosure provide systems and methods for determining fingerprint information of a terminal device in a transportation service. An exemplary system may include a communication interface configured to establish a communication link between first and second terminal devices and receive user data from the first terminal device associated with a user of the transportation service. The communication interface may also be configured to receive authentication information authenticating the second terminal device. The system may also include a memory configured to store the user data and at least one processor coupled to the memory. The at least one processor is configured to determine a first fingerprint of the first terminal device based on the user data after receiving the authentication information authenticating the second terminal device.

20 Claims, 4 Drawing Sheets

(56) References Cited

U.S. PATENT DOCUMENTS

| | | |
|---|---|---|
| 2014/0213238 A1 | 7/2014 | Giraud et al. |
| 2016/0300242 A1 | 10/2016 | Truong |
| 2017/0187707 A1 | 6/2017 | Miu et al. |
| 2017/0316533 A1 | 11/2017 | Goldman-Shenhar et al. |
| 2018/0047220 A1 | 2/2018 | Savoure et al. |
| 2018/0074494 A1 | 3/2018 | Myers et al. |
| 2018/0074495 A1 | 3/2018 | Myers et al. |
| 2018/0075565 A1 | 3/2018 | Myers et al. |
| 2018/0316670 A1* | 11/2018 | Brown .............. H04L 63/0861 |
| 2018/0322103 A1 | 11/2018 | Yeo et al. |
| 2018/0322352 A1 | 11/2018 | Phillips |
| 2018/0338229 A1 | 11/2018 | Nemec et al. |
| 2019/0172279 A1 | 6/2019 | Al-Shaikh et al. |

FOREIGN PATENT DOCUMENTS

| | | |
|---|---|---|
| CN | 106453234 A | 2/2017 |
| CN | 106934627 A | 7/2017 |
| CN | 106997052 A | 8/2017 |
| CN | 107872767 A | 4/2018 |
| WO | 2016164834 A1 | 10/2016 |
| WO | 2017207644 A1 | 12/2017 |

OTHER PUBLICATIONS

Written Opinion of the International Searching Authority issued in corresponding International Application No. PCT/US2018/068218, dated Apr. 1, 2019, 7 pages.

International Search Report issued in related International Application No. PCT/US2018/068214, dated Mar. 29, 2019, 5 pages.

Written Opinion of the International Searching Authority issued in related International Application No. PCT/US2018/068214, dated Mar. 29, 2019, 6 pages.

International Search Report issued in related International Application No. PCT/US2018/068215, dated Apr. 10, 2019, 5 pages.

Written Opinion of the International Searching Authority issued in related International Application No. PCT/US2018/068215, dated Apr. 10, 2019, 8 pages.

\* cited by examiner

SYSTEMS AND METHODS FOR DEVICE FINGERPRINT DETERMINATION IN A TRANSPORTATION SERVICE

RELATED APPLICATIONS

This application is related to concurrently filed U.S. application Ser. No. 16/236,970, filed Dec. 31, 2018, entitled "Systems and Methods for Fraud Detection in a Transportation Service" by Xiaoyong Yi, Yu Wang, and Fengmin Gong, and U.S. application Ser. No. 16/237,016, filed Dec. 31, 2018, entitled "Systems and Methods for Onboard Fraud Detection in a Transportation Service" by Xiaoyong Yi, Yu Wang, and Fengmin Gong, both of which are incorporated by reference in their entireties.

TECHNICAL FIELD

The present disclosure relates to systems and methods for device fingerprint determination in a transportation service, and more particularly to, systems and methods for determining fingerprint information of a terminal device in a transportation service using an authenticated terminal device.

BACKGROUND

Terminal device frauds have negative impact on the fairness and efficiency of transportation services such as ride-hailing (also referred to as ride-sharing) services. For example, transportation service providers (e.g., drivers) may tamper user terminal devices to create fake trips, thus tricking the transportation service platform and make unjustified profits. Fraudsters may also run faked ride-sharing trips to gain awards for accomplishing certain amount of transactions. As each faked mobile device can be assigned to a phone number, using Short Message Service (SMS) to verify is not enough to prevent such fraud activities.

User registration may alleviate the fraud activities to some extent. Existing user registration methods collect basic user information such as user name, phone number, and so on. That information is easy to fake and thus is not enough to prevent fraud activities. On the other hand, although terminal device related information such as Bluetooth™ fingerprint of the user's terminal device is relatively hard to fake, the information is also difficult to acquire (e.g., a user may need to go to a certain location to have his/her terminal device scanned to register the terminal device's Bluetooth™ fingerprint). The inconveniency may deter the user from choosing to use the transportation service.

Embodiments of the disclosure address the above problems by methods and systems for fingerprint determination in a transportation service using authenticated terminal devices to enhance registering accuracy and efficiency.

SUMMARY

In one aspect, embodiments of the disclosure provide a system for determining fingerprint information of a terminal device in a transportation service. An exemplary system may include a communication interface configured to establish a communication link between first and second terminal devices and receive user data from the first terminal device associated with a user of the transportation service. The communication interface may also be configured to receive authentication information authenticating the second terminal device. The system may also include a memory configured to store the user data and at least one processor coupled to the memory. The at least one processor may be configured to determine a first fingerprint of the first terminal device based on the user data after receiving the authentication information authenticating the second terminal device.

In another aspect, embodiments of the disclosure also provide a method for determining fingerprint information of a terminal device in a transportation service. An exemplary method may include a establishing a communication link between first and second terminal devices and receiving user data from the first terminal device associated with a user of the transportation service. The method may also include receiving authentication information authenticating the second terminal device and determining a first fingerprint of the first terminal device based on the user data after receiving the authentication information authenticating the second terminal device.

In a further aspect, embodiments of the disclosure further provide a non-transitory computer-readable medium storing instruction that, when executed by one or more processors, cause the one or more processors to perform a method for determining fingerprint information of a terminal device in a transportation service. The method may include establishing a communication link between first and second terminal devices and receiving user data from the first terminal device associated with a user of the transportation service. The method may also include receiving authentication information authenticating the second terminal device and determining a first fingerprint of the first terminal device based on the user data after receiving the authentication information authenticating the second terminal device.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
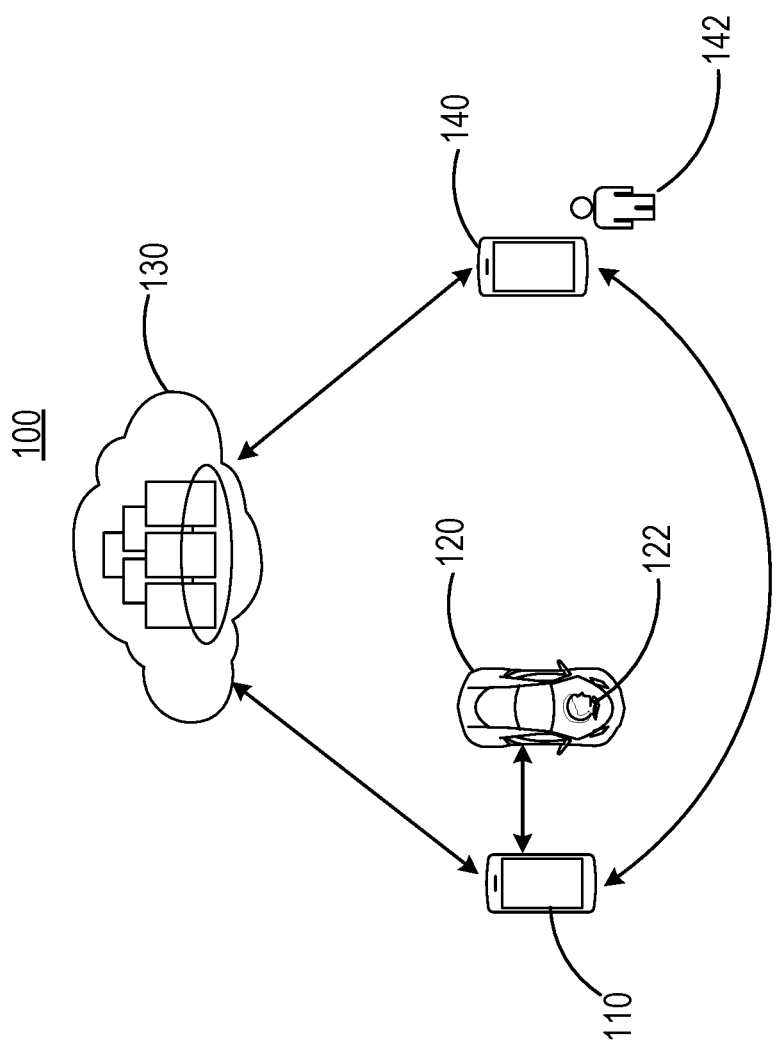
FIG. 1 illustrates a schematic diagram of an exemplary device fingerprint determination system in a transportation service, according to embodiments of the disclosure.

FIG. 1 illustrates a schematic diagram of an exemplary device fingerprint determination system 100 in a transportation service, according to embodiments of the disclosure. As shown in FIG. 1, a service vehicle 120 associated with a service provider 122 may be registered to a transportation service platform (e.g., a ride-hailing or ride-sharing service platform) to provide transportation service to passengers/riders. A terminal device 110 associated with service provider 120 may also be registered. For example, a device fingerprint (e.g., unique information identifying a terminal device, hereinafter simply referred to as "fingerprint") of terminal device 110 may be acquired and stored by the transportation service platform as part of the registration process. The fingerprint may be used as a reference fingerprint in authentication, authorization, verification, or other terminal device identity related processes. In some embodiments, the fingerprint of terminal device 110 may be stored in a server 130, which may be part of the transportation service platform. Server 130 may authenticate terminal device 110 based on the stored reference fingerprint.

In some embodiments, terminal device 110 may be built in, integrated into, installed on, or otherwise associated with service vehicle 120. For example, terminal device 110 may be part of service vehicle 120's built-in system that can be configured to perform fingerprint determination functions disclosed herein (e.g., a built-in computer system). In another example, terminal device 110 may be installed as an add-on system after service vehicle 120 is registered to the transportation service platform. In some embodiments, terminal device 110 may be a stand-alone device separate from service vehicle 120. For example, terminal device 110 may be a mobile device used by service provider 122 that facilitates provision of transportation services.

After registered with a transportation service platform, terminal device 110 may receive authentication information from server 130 (e.g., a cloud server providing computational power, storage space, and/or communication capacity to the transportation service platform). For example, terminal device 110 may be equipped with a communication interface to communicate with server 130, including transmitting data to server 130 and receiving authentication information from server 130. In some embodiments, service vehicle 120 may be equipped with one or more communication interfaces to receive information from and/or transmit information to server 130. In some embodiments, information transmitted from terminal device 110/120 to server 130 may include fingerprint information or may be used to determine the fingerprint of terminal device 110 by server 130. Based on the fingerprint, server 130 may determine whether to authenticate terminal device 110. For example, when server 130 determines to authenticate terminal device 110, server 130 may transmit an authentication back to terminal device 110.

Terminal device 110 may communicate with a terminal device 140 associated with a user 142, either directly or through server 130, to facilitate various functions such as receiving user data including, for example, identification information; transmitting and/or receiving transportation service requests; making and/or receiving payment, or the like. A transportation service request may include a current location of the passenger, a destination of the requested transportation service, a request time, or the like.

In some embodiments, terminal device 140 may be associated with the same transportation service platform to which service vehicle 120 and/or terminal device 110 register. For example, user 142 may use terminal device 140 (e.g., via communication with server 130) to use transportation service provided by the transportation service platform (e.g., a rider uses a smart phone to request transportation service, a driver uses a smart phone to provide transportation service, etc.).

Terminal device 140 may be connected to terminal device 110 via a direct link or through a network, such as a Wireless Local Area Network (WLAN), a Wide Area Network (WAN), wireless networks such as radio waves, a cellular network, a satellite communication network, and/or a local or short-range wireless network (e.g., Bluetooth or near-field communication) for exchanging transportation service-related information.

Consistent with some embodiments, terminal devices 110 and/or 140 may include any suitable devices that can interact with users (e.g., service provider 120 and/or user 142), communicate with server 130 (e.g., transmitting user data including, for example, identification information, to server 130 and/or receive authentication information from server 130), and/or communicate with each other (e.g., by establishing a direct link or through a network, as described above). In some embodiments, terminal devices 110 and/or 140 may be standalone devices or integrated with another device, e.g., a vehicle, a mobile phone, a wearable device, a camera, a smart phone, a tablet, a computer, or the like. It is contemplated that terminal devices 110 and/or 140 may be any kind of electronic devices or equivalent structures equipped with a suitable interface module that enables terminal devices 110 and/or 140 to communicate with each other and/or with server 130.

Consistent with some embodiments, service vehicle 120 may be a vehicle configured to provide transportation services. It is contemplated that service vehicle 120 may be an electric vehicle, a fuel cell vehicle, a hybrid vehicle, or a conventional internal combustion engine vehicle. Service vehicle 120 may have a body and at least one wheel. The body may be of any body style, such as a sports vehicle, a coupe, a sedan, a pick-up truck, a station wagon, a sports utility vehicle (SUV), a minivan, or a conversion van. In some embodiments, service vehicle 120 may include a pair of front wheels and a pair of rear wheels. However, it is contemplated that service vehicle 120 may have more or less wheels or equivalent structures that enable service vehicle 120 to move around. Service vehicle 120 may be configured to be all-wheel drive (AWD), front wheel drive (FWR), or rear wheel drive (RWD). In some embodiments, service vehicle 120 may be configured to be operated by an operator occupying the vehicle, remotely controlled, and/or autonomous.

In some embodiments, server 130 may be a cloud server (as illustrated in FIG. 1), a virtual server, a distributed server, or any other suitable computing device. Server 130 may also include a general-purpose server, or a proprietary device specially designed for device fingerprint determination. It is contemplated that, server 130 can be a stand-alone system (e.g., a server) or an integrated component of a stand-alone server. In some embodiments, server 130 may determine whether to authenticate terminal device 110 based on fingerprint information received from terminal device 110. For example, server 130 may determine if the fingerprint received from terminal device 110 or a fingerprint determined based on data received from terminal device 110 matches a reference fingerprint. Based on the matching result, server 130 may generate an authentication to authenticate terminal device 110 (e.g., if the fingerprint does match the reference fingerprint) or deny authentication (e.g., if the fingerprint does not match the reference fingerprint). Server 130 may transmit the authentication or denial to terminal device 110.

Figure 2:
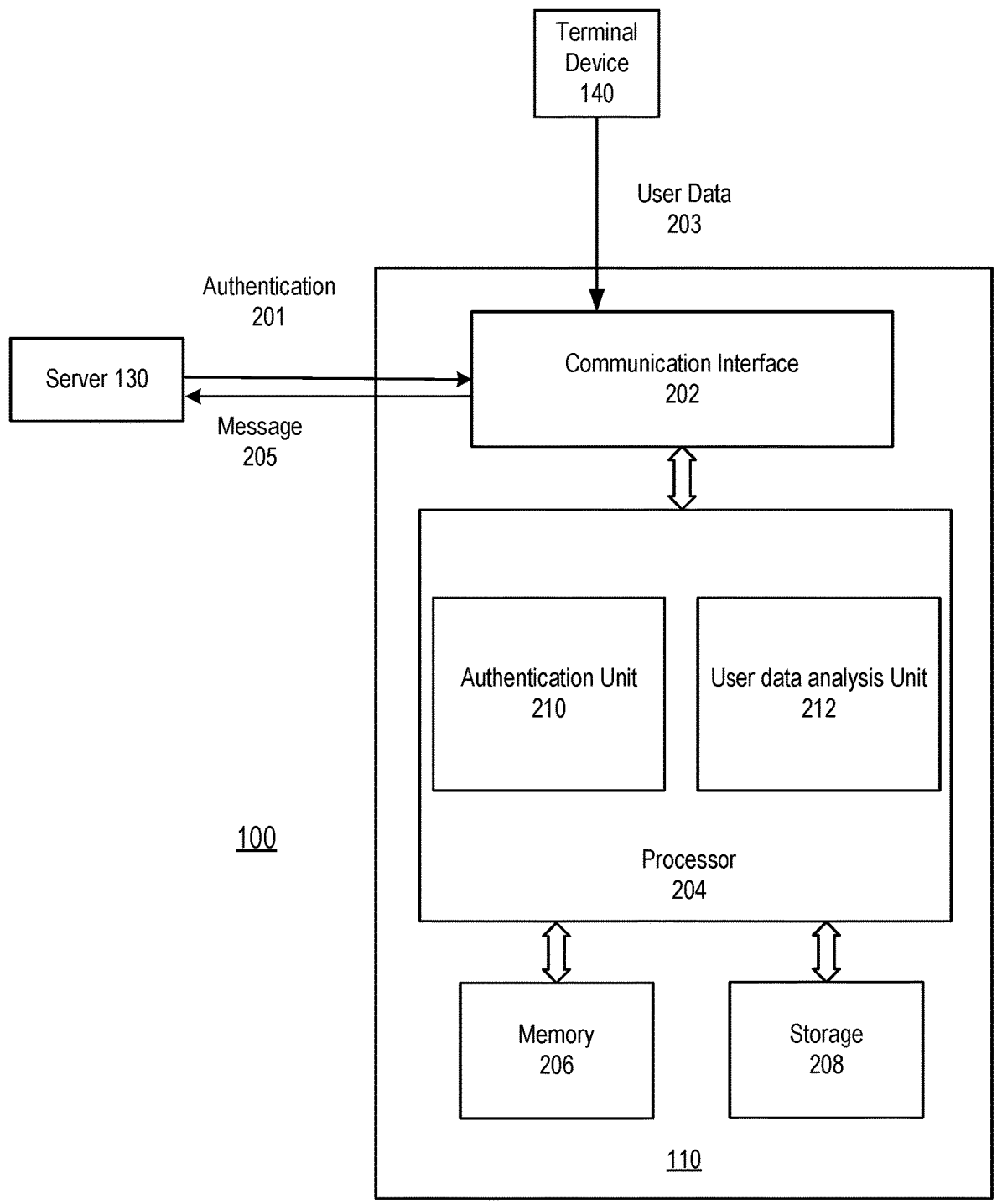
FIG. 2 illustrates a block diagram of an exemplary fingerprint determining system, according to embodiments of the disclosure.

FIG. 2 illustrates a block diagram of system 100, according to embodiments of the disclosure. Consistent with some embodiments, terminal device 110 may transmit user data (not shown) including, for example, identification information of terminal device 110 or fingerprint information to server 130 to request authentication. Server 130 may be configured to determine a terminal device fingerprint of terminal device 110 based on the received user data and compare the fingerprint with a pre-stored reference fingerprint to determine whether to authenticate terminal device 110. If, for example, the fingerprint matches the reference fingerprint, server 130 may authenticate terminal device 110. As a result, terminal device 110 may receive authorization information 201 from server 130 after server 130 authenticates terminal device 110. After authenticated, terminal device 110 may act as an extension of server 130 to determine fingerprint information of other terminal devices, such as terminal device 140. Terminal device 110 may transmit a message (e.g., message 205) including a determined terminal device fingerprint to server 130. For example, terminal device 110 may receive user data 203 from terminal device 140 and determine the fingerprint of terminal device 140 based on the received user data 203.

In some embodiments, as shown in FIG. 2, terminal device 110 may include a communication interface 202, a processor 204, a memory 206, and a storage 208. In some embodiments, terminal device 110 may have different modules in a single device, such as an integrated circuit (IC) chip (implemented as an application-specific integrated circuit (ASIC) or a field-programmable gate array (FPGA)), or separate devices with dedicated functions. In some embodiments, one or more function blocks of terminal device 110 may be implemented in association with a cloud computing environment. For example, certain computational and/or storage tasks may be performed jointly by terminal device 110 and a remote server, such as server 130. Components of terminal device 110 may be in an integrated device or arranged in a distributed manner but communicate with each other through direct links or one or more networks (not shown).

Communication interface 202 may send data to and receive data from components such as terminal device 140 and server 130 via communication cables, a Wireless Local Area Network (WLAN), a Wide Area Network (WAN), wireless networks such as radio waves, a cellular network, satellite communication links, and/or a local or short-range wireless network (e.g., Bluetooth™), or other communication methods. In some embodiments, communication interface 202 can be an Integrated Services Digital Network (ISDN) card, a cable modem, a satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a wireless network.

Consistent with some embodiments, communication interface 202 may receive data such as authentication information 201 from server 130 as well as user data 203 from terminal device 140. In some embodiments, communication interface 202 may also transmit messages (e.g., message 205) to server 130. In some embodiments, message 205 may include terminal device fingerprint of terminal device 140 determined by terminal device 110 based on user data 203 received from terminal device 140.

In some embodiments, communication interface 202 may further provide any received data to memory 206/storage 208 for storage or to processor 204 for processing. Communication interface 202 may also send terminal device fingerprint (e.g., included in message 205) determined by processor 204 based on user data 203 to server 130, or any remote device via a network.

Processor 204 may include any appropriate type of general-purpose or special-purpose microprocessor, digital signal processor, or microcontroller. Processor 204 may be configured as a separate processor module dedicated to determining terminal device fingerprint of a terminal device in transportation services. Alternatively, processor 204 may be configured as a shared processor module for performing other functions unrelated to terminal device fingerprint determination.

As shown in FIG. 2, processor 204 may include multiple modules, such as an authentication unit 210, user data analysis unit 212, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions disclosed herein. Although FIG. 2 shows authentication unit 210 and user data analysis unit 212 both within one processor 204, it is contemplated that these units may be distributed among multiple processors located close to or remotely with each other.

In some embodiments, authentication unit 210 may generate identification information indicating the identity of terminal device 110 and transmit the identification information to server 130 for authentication purpose through communication interface 202. In some embodiments, based on the identification information, server 130 may determine a terminal device fingerprint of terminal device 110 such as Bluetooth™ fingerprint, International Mobile Equipment Identity (IMEI) of terminal device 110, or the like. Based on the determined terminal device fingerprint, server 130 may be configured to compare the determined terminal device fingerprint of terminal device 110 with a reference terminal device fingerprint that is predetermined and stored in a storage unit of server 130. In some embodiments, the terminal device fingerprint may be associated with a phone number, a Bluetooth™ fingerprint, an International Mobile Equipment Identity (IMEI), or any other information indicating an identity of the terminal device. In some embodiments, the reference terminal device fingerprint of terminal device 110 may be acquired any time before terminal device 110 initiates an authentication process. For example, a Bluetooth™ fingerprint reader or scanner may be used to determine the Bluetooth™ fingerprint of terminal device 110 when terminal device 120 is registered for participating transportation services (e.g., as a rider or service provider). The Bluetooth™ fingerprint reader or scanner may transmit the determined Bluetooth™ fingerprint to server 130 and store the fingerprint in the storage of server 130 as a reference terminal device fingerprint for authentication purposes. In some other embodiments, the reference fingerprint of terminal device 110 may also be acquired by another authenticated terminal device such as a terminal device similar to terminal device 110. For example, the reference fingerprint of terminal device 110 may be determined and transmit to server 130 by another authenticated terminal device through a similar process as the fingerprint determination process disclosed herein.

In some embodiments, the fingerprint of terminal device 110 may be determined by service vehicle 120 (e.g., by a computing system integrated or otherwise associated with service vehicle 120) based on, for example, establishing communication links such as Bluetooth™ connections between terminal device 110 and service vehicle 120. The determined fingerprint may be encrypted and sent back to terminal device 110, which may in turn transmit the encrypted fingerprint to server 130. Server 130 may first decrypt the encrypted fingerprint, and then compare the fingerprint with the reference fingerprint to determine whether the authenticate terminal device 110.

Terminal device 110 may determine device fingerprints of other terminal devices, such as terminal device 140, after receiving authentication 201 from server 130. For example, user data analysis unit 212 may receive and analyze user data 203 to extract relevant information for determining terminal device fingerprint based on user data 203. It is noted that user data analysis unit 212 may receive and analyze user data 203 prior to, simultaneously, or after terminal device 110 is authenticated. In some embodiments, user data 203 may include identification information of terminal device 140. Based on the identification information, user data analysis unit 212 may determine a terminal device fingerprint of terminal device 140 such as Bluetooth™ fingerprint, International Mobile Equipment Identity (IMEI) of terminal device 110, or the like. Based on the determined terminal device fingerprint, user data analysis unit 212 may generate a message (e.g., message 205) including the determined terminal device fingerprint and transmit the message to server 130. In some embodiments, the terminal device fingerprint may be associated with a phone number, a Bluetooth™ fingerprint, an International Mobile Equipment Identity (IMEI), or any other information indicating an identity of terminal device 140. In some embodiments, the determined fingerprint may be used as a reference terminal device fingerprint for later authentication purpose (e.g., server 130 may use the received terminal device fingerprint to later authenticate terminal device 140 when terminal device 140 requests authentication).

In some embodiments, user data analysis unit 212 may determine terminal device fingerprint of terminal device 140 based on user data 203 transmitted via communication established between terminal device 110 and terminal device 140. For example, communication interface 202 may establish a connection with terminal device 140. User data analysis unit 212 may determine the terminal device fingerprint of terminal device 140 based on information exchanged with terminal device 140 (e.g., user data 203) through the connection. In some embodiments, user data analysis unit 212 may extract the information indicating the identity of terminal device 140. For example, communication interface 202 may establish a Bluetooth™ communication with terminal device 140. User data analysis unit 212 may determine a Bluetooth™ fingerprint of terminal device 140 based on the Bluetooth™ signals received from terminal device 140. In another example, user data 203 may include information indicating the International Mobile Equipment Identity (IMEI) of terminal device 140. User data analysis unit 212 may determine the terminal device fingerprint (e.g., IMEI in this scenario) of terminal device 140 based on user data 203.

Memory 206 and storage 208 may include any appropriate type of mass storage provided to store any type of information that processor 204 may need to operate. Memory 206 and storage 208 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform fingerprint determination disclosed herein. For example, memory 206 and/or storage 208 may be configured to store program(s) that may be executed by processor 204 to determine terminal device fingerprints based on user data received from a terminal device.

Memory 206 and/or storage 208 may be further configured to store information and data used by processor 204. For instance, memory 206 and/or storage 208 may be configured to store various types of data (e.g., user data, terminal device fingerprint data, authentication data, etc.) transmitted by terminal device 140 and/or server 130. The various types of data may be stored permanently, removed periodically, or disregarded immediately after each frame of data is processed.

Figure 3:
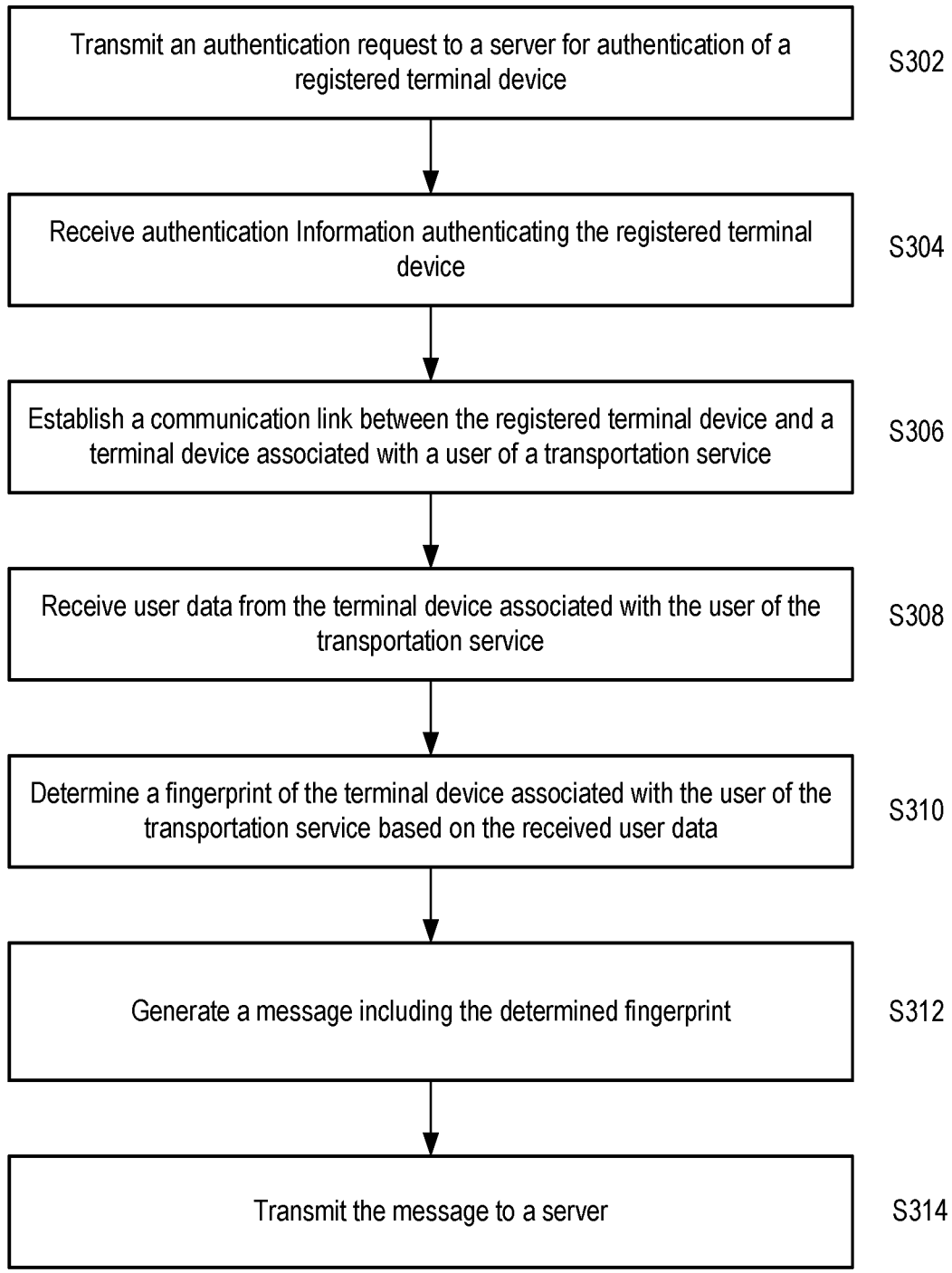
FIG. 3 illustrates a flowchart of an exemplary method for fingerprint determination in a transportation service, according to embodiments of the disclosure.

FIG. 3 illustrates a flowchart of an exemplary method for device fingerprint determination in a transportation service, according to embodiments of the disclosure. In some embodiments, method 300 may be performed by terminal device 110. It is noted that method 300 is not limited to that exemplary embodiment and may be implemented jointly by terminal device 110, terminal device 140, and/or server 130. Method 300 may include steps S302-S314 as described below. It is to be appreciated that some of the steps may be optional to perform the disclosure provided herein. Further, some of the steps may be performed simultaneously, or in a different order than shown in FIG. 3.

In step S302, terminal device 110 may transmit an authentication request to server 130 for authentication purpose. For example, the authentication request may include identification information and/or fingerprint information of terminal device 110. As described above, terminal device 110 may be registered with a transportation service platform and the fingerprint of terminal device 110 may have been obtained and stored in server 130. In some embodiments, terminal device 110 may be connected to server 130 via a direct link or through a network to transmit the authentication request.

In step S304, terminal device 110 may receive authentication information from server 130 authenticating terminal device 110. In some embodiment, server 130 may determine a terminal device fingerprint of terminal device 110 based on the data transmitted to server 130. For example, server 130 may have an individual module or a module built-in another device that can extract the information indicating the identity of terminal device 110. Server 130 may also authenticate terminal device 110 by comparing the determined terminal device fingerprint with a reference terminal device fingerprint. In some embodiments, the reference fingerprint may be acquired any time before terminal device 110 initiates an authentication process. For example, a Bluetooth™ fingerprint reader or scanner may be used to determine the Bluetooth™ fingerprint of terminal device 110 when terminal device 110 is registered to facilitate transportation services. The Bluetooth™ fingerprint reader or scanner may transmit the determined Bluetooth™ fingerprint to server 130, which may store the fingerprint as the reference fingerprint of terminal device 110 for authentication purposes.

In some embodiments, server 130 may use the rise time signature of terminal device 110 to match the reference fingerprint. In some embodiments, physical layer fingerprints (physical layer authentication solutions) may be used to match the fingerprint of terminal device 110 and the reference fingerprint.

In some embodiments, if the determined terminal device fingerprint matches the reference terminal device fingerprint, terminal device 110 may receive from server 130 an authentication authenticating terminal device 110, which may then determine fingerprint information of other terminal devices (e.g., terminal device 140). Otherwise, terminal device 110 may receive a notice indicating that the terminal device fingerprint dose not match the reference fingerprint and server 130 may thus deny terminal device 110's authentication request. In some embodiments, the transportation service platform (e.g., via server 130) may take further actions (e.g., initiating a fraud alert, disfranchising the license of the fraudsters, contacting third party authorities such as local police stations, etc.) after it is determined that the terminal device fingerprint does not match the reference fingerprint.

After receiving the authentication, in steps S306-310, terminal device 110 may perform fingerprint determination operations to determine fingerprint information of another terminal device, such as terminal device 140. In step S306, terminal device 110 may establish a communication link between terminal device 110 and another terminal device whose terminal device fingerprint is to be determined (e.g., terminal device 140). As described above, terminal device 140 may be associated with user 142, who may use the transportation service to which terminal device 110 is registered. In step S308, terminal device 110 may receive user data 203 from terminal device 140. For example, user data 203 may include identification information of terminal device 140. In step S310, terminal device 110 may determine a terminal device fingerprint of terminal device 140 based on the received user data. In some embodiments, the terminal device fingerprint may be associated with a phone number, a Bluetooth™ fingerprint, an International Mobile Equipment Identity (IMEI), or any other information indicating an identity of the terminal device. For example, terminal device 110 may establish a Bluetooth™ communication link with terminal device 140 and determine the Bluetooth™ fingerprint of terminal device 140 based on the Bluetooth™ signals received from terminal device 140.

In step S312, terminal device 110 may generate a message including the determined fingerprint of terminal device 140. For example, the message may include an encrypted version of the determined fingerprint for transmission to server 130. In step S314, terminal device 110 may transmit the message to a server associated with the transportation service platform (e.g., server 130). In some embodiments, server 130 may store the determined fingerprint as the reference fingerprint of terminal device 140. For example, after receiving the determined fingerprint of terminal device 140, terminal device 140 may later request authentication from server 130, for example, for determining another terminal device's fingerprint. The determined fingerprint of terminal device 140 may be used as the reference fingerprint for authenticating terminal device 140.

Figure 4:
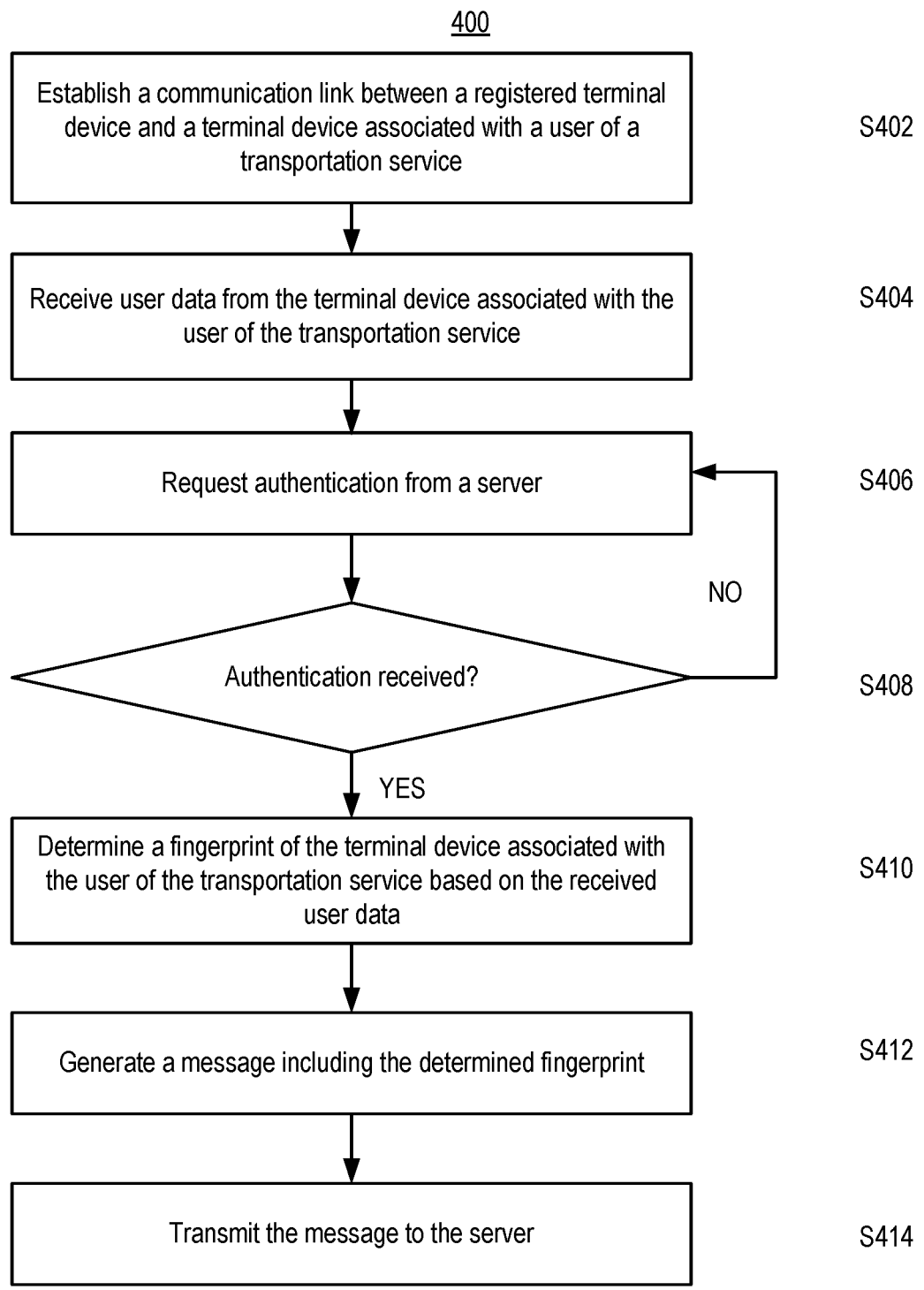
FIG. 4 illustrates a flowchart of another exemplary method for fingerprint determination in a transportation service, according to embodiments of the disclosure

FIG. 4 is a flow chart of another exemplary method 400 for determining device fingerprints, according to embodiments of the disclosure. In some embodiments, method 400 may be performed by terminal device 110. It is noted that method 400 is not limited to that exemplary embodiment and may be implemented jointly by terminal device 110, terminal device 140, and/or server 130. Method 400 may include steps S402-S414 as described below. It is to be appreciated that some of the steps may be optional to perform the disclosure provided herein. Further, some of the steps may be performed simultaneously, or in a different order than shown in FIG. 4.

In step S402, terminal device 110 may establish a communication link between terminal device 110 and another terminal device whose terminal device fingerprint is to be determined (e.g., terminal device 140). Step S402 is similar to step S306. In step S404, terminal device 110 may receive user data 203 from terminal device 140, similar to step S308. In step S406, terminal device 110 may request authentication from server 130 by transmitting an authentication request to server 130, similar to step S302.

In step S408, terminal device 110 may determine if the authentication is received. In some embodiment, server 130 may determine a terminal device fingerprint of terminal device 110 based on the data transmitted to server 130, similar to operations performed by server 130 in connection with the description of step S304. If terminal device 110 does not receive the authentication, method 400 loops back to step S406, where terminal device 110 may transmit another authentication request to server 130. If terminal device 110 receives the authentication, method 400 proceeds to step S410, where terminal device 110 may determine a fingerprint of terminal device 140. Step S410 is similar to step S310. In step S412, terminal device 110 may generate a message including the determined fingerprint. Step S412 is similar to step S312. In step S414, terminal device 110 may transmit the message to server 130. Step S414 is similar to step S314.

Embodiments of the present disclosure provide a secure method of acquiring device fingerprint information that is not available in current systems. Systems and methods disclosed herein enable a first user (e.g., a transportation service provider or a rider) to use his/her terminal device to securely determine device fingerprint information of another terminal device (e.g., associated with a second user) after the first user's terminal device has been properly authenticate. As a result, the second user (e.g., a rider or a service provider) need not to go to a certain location to have his/her terminal device scanned for fingerprint determination purposes (e.g., as part of the registration process). The disclosed systems and methods improve the convenience and efficiency of acquiring device fingerprint information, which is relatively difficult to tamper, and thus increasing the overall security of using the transportation services.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for determining fingerprint information of a first terminal device in a transportation service, comprising:
   a communication interface equipped on a second terminal device registered to a transportation service platform to provide the transportation service, wherein the communication interface is configured to communicate with the first terminal device associated with a user requesting the transportation service;
a memory storing instructions; and
at least one processor communicatively coupled to the memory and the communication interface, wherein the at least one processor is configured to execute the instructions to:
   control the communication interface equipped on the second terminal device to establish a communication link with the first terminal device associated with the user requesting the transportation service;
   receive communication signals from the first terminal device through the communication link;
   control the communication interface to transmit an authentication request to a server of the transportation service platform to authenticate the second terminal device;
   control the communication interface to receive authentication information from the server authenticating the second terminal device; and
   determine a first fingerprint of the first terminal device based on the communication signals received from the first terminal device after receiving the authentication information from the server authenticating the second terminal device.

2. The system of claim 1, wherein the at least one processor is further configured to execute the instructions to control the communication interface to transmit the first fingerprint to the server.

3. The system of claim 1, wherein the second terminal device is associated with a service vehicle.

4. The system of claim 1, wherein the authentication request comprises a second fingerprint of the second terminal device.

5. The system of claim 4, wherein the authentication information is provided by the server based on matching the second fingerprint with a reference fingerprint.

6. The system of claim 1, wherein the at least one processor is further configured to execute the instructions to:
   control the communication interface to receive identification information of the first terminal device using the communication signals; and
   determine the first fingerprint of the first terminal device based on the identification information.

7. The system of claim 6, wherein the identification information includes information of a transmitter of the first terminal device, the transmitter being used for establishing the communication link.

8. The system of claim 7, wherein the information of the transmitter includes rise time signature of the transmitter of the first terminal device associated with the communication signals transmitted in the communication link.

9. The system of claim 1, wherein the communication link is a short-range communication link.

10. A computer-implemented method for determining fingerprint information of a first terminal device associated with a user requesting a transportation service, comprising:
   establishing, through a communication interface equipped on a second terminal device registered to a transportation service platform to provide the transportation service, a communication link between the first and the second terminal devices;
   receiving, through the communication interface, communication signals from the first terminal device via the communication link;
   transmitting, through the communication interface, an authentication request to a server of the transportation service platform to authenticate the second terminal device;
   receiving, through the communication interface, authentication information from the server authenticating the second terminal device; and
   determining a first fingerprint of the first terminal device based on the communication signals received from the first terminal device after receiving the authentication information from the server authenticating the second terminal device.

11. The method of claim 10, further comprising transmitting the first fingerprint to the server.

12. The method of claim 10, wherein the second terminal device is associated with a service vehicle.

13. The method of claim 10,
   wherein the authentication request comprises a second fingerprint of the second terminal device.

14. The method of claim 13, wherein the authentication information is provided by the server based on matching the second fingerprint with a reference fingerprint.

15. The method of claim 10, further comprising:
   receiving identification information of the first terminal device using the communication signals; and
   determining the first fingerprint of the first terminal device based on the identification information.

16. The method of claim 15, wherein the identification information includes information of a transmitter of the first terminal device, the transmitter being used for establishing the communication link.

17. The method of claim 16, wherein the information of the transmitter includes rise time signature of the transmitter of the first terminal device associated with the communication signals transmitted in the communication link.

18. The method of claim 10, wherein the communication link is a short-range communication link.

19. A non-transitory computer-readable medium storing instruction that, when executed by one or more processors, cause the one or more processors to perform a method for determining fingerprint information of a first terminal device associated with a user requesting a transportation service, the method comprising:
   establishing, through a communication interface equipped on a second terminal device registered to a transportation service platform to provide the transportation service, a communication link between the first and the second terminal devices;
   receiving, through the communication interface, communication signals from the first terminal device via the communication link;
   transmitting, through the communication interface, an authentication request to a server of the transportation service platform to authenticate the second terminal device;
   receiving, through the communication interface, authentication information from the server authenticating the second terminal device; and
   determining a first fingerprint of the first terminal device based on the communication signals received from the first terminal device after receiving the authentication information from the server authenticating the second terminal device.

20. The non-transitory computer-readable medium of claim 19, wherein the method further comprises:
   receiving identification information of the first terminal device using the communication signals; and determining the first fingerprint of the first terminal device based on the identification information.

* * * * *